Dec. 13, 1938.  W. M. CATCHPOLE  2,139,802
MACHINE FOR TOPPING SUGAR BEETS IN THE GROUND
Filed Nov. 26, 1937
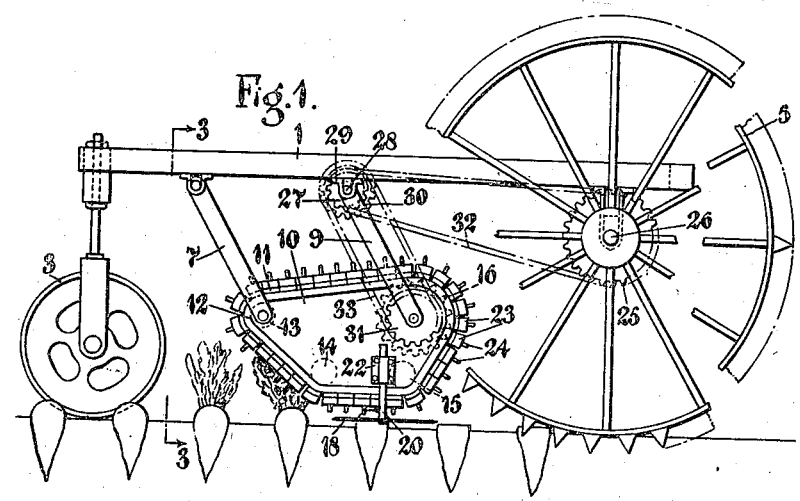
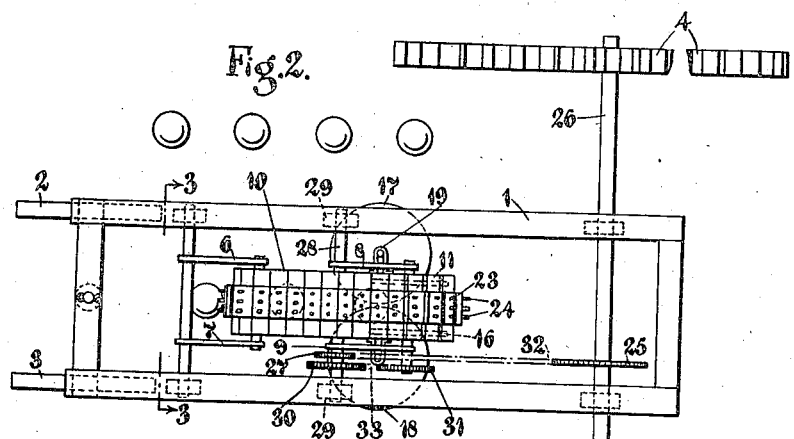
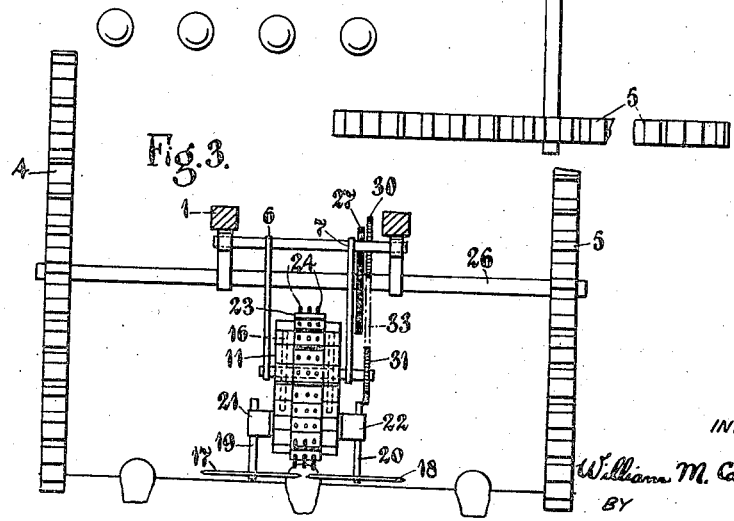
INVENTOR
William M. Catchpole,
BY
Smith, Michael & Gardiner,
ATTORNEYS Patented Dec. 13, 1938

2,139,802

UNITED STATES PATENT OFFICE 2,139,802

MACHINE FOR TOPPING SUGAR BEETS IN THE GROUND

William Milne Catchpole, Bury St. Edmunds, England

Application November 26, 1937, Serial No. 176,711
In Great Britain December 1, 1936

4 Claims. (Cl. 55—107)

This invention relates to machines for topping sugar beets in position in the ground, the beets being disposed in rows.

It is an essential requirement in the beet sugar industry that the crown of the beet, carrying the leaves, shall be sheared off square, that is, perpendicular to the longitudinal axis of the beet. It is also essential that the crown which is sheared off shall be as shallow as possible compatible with the removal of every trace of leaf.

The object of the present invention is to provide a machine in which these requirements are provided for in a simple and effective manner, notwithstanding the non-uniformity to size and extent of projection above the surface of the ground which invariably characterizes beets growing in a field. In one part of the field, for instance, the beets will be more or less uniformly larger than the beets in another part of the field, and their crowns may project correspondingly higher above the ground. This variation is also noticeable in succeeding beets in a row.

According to the invention, a machine for topping sugar beets in position in the ground, the beets being disposed in rows, comprises a wheeled frame to be moved along the ground in a direction parallel to the rows of beets, a self-laying track unit adapted, as the frame is moved along the ground, to ride, as regards the active portion of the track, upon the beet tops, one at a time, (it being understood that by the active portion of the track is meant the lower horizontally disposed portion of the endless track or tread belt of the unit which at any given moment is riding over a beet) laying its path thereover at substantially the speed of travel of the machine and so floatably supported upon the frame as to be capable of rising and falling movement relatively thereto always parallel to itself, whereby the active portion of the track is always parallel to the surface of the ground, and knife means carried upon the track unit, so as to be movable as one therewith in the rising and falling movements of the unit, and adapted to shear off the top of the beet upon which the unit is riding, the plane of severance of the beet top being parallel to the surface of the ground and situated below the level of the said active portion of the track.

In the use of the improved sugar beet topping machine of this invention the track unit, which as will be appreciated consitutes in effect a ledger element relatively to the knife means, always maintains a position in the machine in which it is parallel to the ground and in which, therefore, the plane of severance of the knife means relatively to the beet is perpendicular to the longitudinal axis of the beet, that is to say, irrespective of the size of the beet or of its height of projection above the surface of the ground. In consequence, the beet tops are uniformly sheared off, not only in respect of depth of cut, measuring down from the top of the beet, but also in respect of perpendicularity of cut relatively to the longitudinal axis of the beet. In addition, this result is achieved without the necessity of employing a complicated and expensive system of interlinkage as between the track unit and the knife means, such as would be necessary if, for example, the track unit were pivotally mounted in the machine for angular movement therein in contrast to movement parallel to itself as in the machine of the present invention, that is, in order to maintain the plane of severance of the knife means parallel to the surface of the ground and therefore, as stated, perpendicular to the longitudinal axes of the beets to be cut.

Further advantages of the improved arrangement according to the invention are as follows:—

Firstly, with the employment of a track unit carrying the knife means, which is movable in its rising and falling movements, parallel to itself, in contrast again to an arrangement employing a pivotally movable unit, it is readily possible to provide for a thoroughly ample range of rising and falling movement of the unit and with it, the knife means, for the parallel links which will preferably be employed, as in the embodiment of the invention hereinafter, set forth, for the support of the unit from the machine framework may be made of any length at all, within, of course, practical limits, thus giving almost any desired range of rise and fall of the unit in the machine.

Secondly, the relative position of the knife means to the active portion of the track of the track unit longitudinally thereof is always the same for all vertical positions of the unit and in consequence, it is readily possible to provide an arrangement wherein the active portion of the track of the track unit is always in contact with one beet only at a time, and wherein accordingly, each beet is severed before the track of the unit engages the next beet in the row.

The invention will now be further described with reference to the accompanying drawing which illustrates a preferred embodiment by way of example, and in which Figure 1 is an elevation of the machine in operation;

Figure 2 is a plan view of the machine, and

Figure 3 is a section through the machine on the section line 3—3 of Figures 1 and 2.

The machine comprises a frame 1 of any convenient or desired form. This frame is suported from the ground through the intermediary of a pair of steering wheels 2, 3 at the front and a pair of larger wheels 4, 5 at the rear.

Suspended from the frame 1 upon a system of parallel links 6, 7, 8, 9, for rising and falling movement parallel to itself is a self-laying track unit 10. This unit comprises an endless track of wooden slats 11 mounted at the ends upon a pair of endless chains 12. These chains are in turn mounted upon three guide rollers 13, 14, 15 and a co-axially disposed pair of driving sprockets 16 for the track, the two sprockets being allocated respectively to the two chains. If desired, instead of the three rollers 13, 14, 15, sprockets may be employed. Also, there may be one or more additional rollers or sprockets (not shown) intervening between the rollers 14, 15 if this should be necessary in order to ensure adequate vertical support for the portion of the track between these rollers, which, as will be appreciated, is the active portion of the track, or the portion thereof which rides over the top of the beet as the crown of the latter is being sheared off.

The said active portion of the track is horizontally disposed in the machine and on account of the fact that the unit moves parallel to itself, in rising and falling with variation in the height of projection of the beet tops from the surface of the ground, the horizontality of the said portion of the track is maintained.

Mounted upon the track unit 10 are a pair of circular knives 17, 18 disposed abreast of one another, one on either side of the longitudinal centre line of the unit, with their peripheries close to one another as shown in Figures 2 and 3. The knives 17, 18 are freely revoluble on spindles 19, 20 which in turn are carried in bearings 21, 22. The rotational axes of the knives 17, 18 are perpendicular to the said active portion of the track 11. In consequence, as the said active portion rides across the crown of a beet, the top of the beet is sheared off by the knives 17, 18 in a plane which is maintained parallel to the surface of the ground, inasmuch as the line of the said active portion of the track is at all times parallel to the surface of the ground.

The knives 17, 18 are disposed, of course, in a plane located below the level of the tread of the active portion of the track, the distance below being dependent upon the desired depth of cut of the beet top, and if desired, they may be so mounted as to be adjustable in this respect to suit the particular requirements of the machine.

The proportions of the track unit and the position of the knives longitudinally thereof, taking into consideration the free space afforded between the converging peripheries of the knives at the forward side thereof, should be such that the active portion of the endless track of the unit shall be capable of positioning or landing itself upon the crown of the beet before the knives begin to engage the beet. Also, in order to allow the unit to rise or fall for each individual beet, it is necessary that the distance, longitudinally of the unit, between the axes of the knives and the axis of the roller 14 shall be as small as possible compatible with allowing the unit to position itself, as above described, upon the beet before the knives commence to engage the beet. In this way, the unit is able completely to finish cutting one beet before it commences to position itself upon the next beet in the row.

The tread of the track 11 is formed with a centre portion 23 which projects beyond the rest of the surface of the tread so that at the sides thereof space is provided, as shown in Figure 3, for the accommodation of the leaves of the beet as the unit rides over the top thereof, and in order to neutralize any tendency there may be for the beet to be pushed over by the knives 17, 18 as these operate to shear off the top of the beet, the said portion 23 of the tread, with or without also the remaining portions of the tread on either side of the centre portion, is fitted with spikes 24 which as the track unit traverses the top of the beet dig into the latter and virtually hold it against the oppositely directed thrust of the knives. Advantageously in this connection, the linear speed of the track of the track unit may be slightly in excess of the speed of travel of the machine along the ground so as more positively to ensure that the spikes of the track shall hold the beet as it is being sheared in the manner described. Also it may be said to be generally essential, in order that the beet undergoing severance shall not be pushed over during the operation, that as by the provision of spikes on the tread surface of the track, the track shall effect a hold or grip on the beet as it rides over it.

The track of the track unit is arranged to be driven from the rear ground wheels 4, 5 of the machine through the intermediary, for example of a sprocket wheel 25 on the axle 26 of the said ground wheels, a sprocket 27 on a cross shaft 28 mounted in bearings 29 on the frame 1, a second sprocket 30 on the said cross shaft 28, a sprocket 31 co-axial and fast with the track chain sprockets 16 of the track unit and endless chains 32, 33 connecting respectively the two sprockets 25, 27 and 30, 31.

In the above specific embodiment of the invention, the circular knives 17, 18 are arranged to be rotated around their axes by engagement with the beet top. This arrangement, as will be appreciated, makes for simplicity of construction. If desired, however, the knives may be arranged to be driven positively, for example, as in the case of the track of the track unit, from the ground wheels 4, 5 of the frame of the machine.

Also, the track of the track laying unit may if desired be driven positively by a suitably jointed shaft from the gearing of a tractor coupled to the machine for drawing it along the ground, the speed of this shaft being such that the rate of travel of the track is proportional to the rate of travel of the tractor wheels over the ground. For example, such a shaft could be arranged to drive the cross shaft 28 through the intermediary of bevel or worm gearing. In this event, the ground wheels of the machine would be relieved of the duty of driving the track and would merely serve to carry the weight of the machine. In this way, the complications which would be caused by stoppage of the driving wheels, for example in wet weather or in very loose soils, would be avoided. It will be understood in this connection that if from any cause the track speed should fall below the rate of travel of the machine along the ground, the unit will operate only to push the beets over in the ground and break them off, thus frustrating the purpose of the invention.

The machine, incorporating the self-laying track unit and the rotary knives carried upon the unit, may either be a separate machine to be drawn along the ground, for example by a tractor, in front of another or other machines operative to dig up the topped beets and then clean them, or a composite machine incorporating also digging and cleaning units. If desired, moreover, the machine incorporating the track-laying unit and the knives, with or without also digging and cleaning units, may be fitted with an engine to drive the parts, actually carried upon the machine and operative also if required to propel the machine along the ground.

It will be obvious to engineers in the art that the construction described and shown is capable of variation in respect to details of construction, such, for example, as the form and construction of the self-laying track unit, the form and construction of the knife means and the form of drive of the parts. All such variations are to be understood as within the scope of the following claims.

What I claim as my invention and desire to secure by Letters Patent of the United States is:—

1. A machine for topping beets in the ground, the beets being disposed in rows, which comprises in combination a wheeled frame to be moved along the ground in a direction parallel to the rows of beets, a self-laying track unit adapted, as the frame is moved along the ground, to ride, as regards the active portion of the track, upon the tops of the beets, one at a time, laying its path thereover at substantially the speed of travel of the frame along the ground and so floatably supported upon the frame as to be capable of rising and falling movement relatively thereto always parallel to itself, whereby the active portion of the track is always parallel to the surface of the ground, and knife means carried upon the track unit, so as to be movable as one therewith in the rising and falling movements of the unit, and adapted to shear off the top of the beet upon which the unit is riding, the plane of severance of the beet top being parallel to the surface of the ground and situated below the level of the said active portion of the track.

2. A machine for topping beets in the ground, the beets being disposed in rows, which comprises in combination a wheeled frame to be moved along the ground in a direction parallel to the rows of beets, a self-laying track unit adapted, as the frame is moved along the ground, to ride, as regards the active portion of the track, upon the tops of the beets, one at a time, laying its path thereover at substantially the speed of travel of the frame along the ground and so floatably supported upon the frame as to be capable of rising and falling movement relatively thereto always parallel to itself, whereby the active portion of the track is always parallel to the surface of the ground, and a pair of freely revoluble circular knives operative by rotating consequent upon their engagement with the beet upon which the track unit is riding, to shear off the top thereof, which knives are carried upon the unit, so as to be movable as one therewith in the rising and falling movements of the unit, with their axes of rotation perpendicular to the path of the unit and laterally abreast of one another, one on either side of the longitudinal centre line of the unit.

3. A machine for topping beets in the ground, the beets being disposed in rows, which comprises in combination a wheeled frame to be moved along the ground in a direction parallel to the rows of beets, a self-laying track unit adapted, as the frame is moved along the ground, to ride, as regards the active portion of the track, upon the tops of the beets, one at a time, laying its path thereover at substantially the speed of travel of the frame along the ground and so supported through the intermediary of a parallel link suspension upon the frame as to be capable of rising and falling movement relatively thereto always parallel to itself, whereby the active portion of the track is always parallel to the surface of the ground, and knife means carried upon the track unit, so as to be movable as one therewith in the rising and falling movements of the unit, and adapted to shear off the top of the beet upon which the unit is riding, the plane of severance of the beet top being parallel to the surface of the ground and situated below the level of the said active portion of the track.

4. A machine for topping beets in the ground, the beets being disposed in rows, which comprises in combination a wheeled frame to be moved along the ground in a direction parallel to the rows of beets, a self-laying track unit adapted, as the frame is moved along the ground, to ride, as regards the active portion of the track, upon the tops of the beets, one at a time, laying its path thereover at substantially the speed of travel of the frame along the ground and so floatably supported upon the frame as to be capable of rising and falling movement relatively thereto always parallel to itself, whereby the active portion of the track is always parallel to the surface of the ground, and knife means carried upon the track unit, so as to be movable as one therewith in the rising and falling movements of the unit, and adapted to shear off the top of the beet upon which the unit is riding, the plane of severance of the beet top being parallel to the surface of the ground and situated below the level of the said active portion of the track and the latter being formed with a centre portion which projects beyond the rest of the surface of the track for the purpose specified.

WILLIAM MILNE CATCHPOLE.